Jan. 20, 1959     G. NAUJOKAT     2,869,352
LOCK FOR BICYCLES AND THE LIKE
Filed Aug. 6, 1956
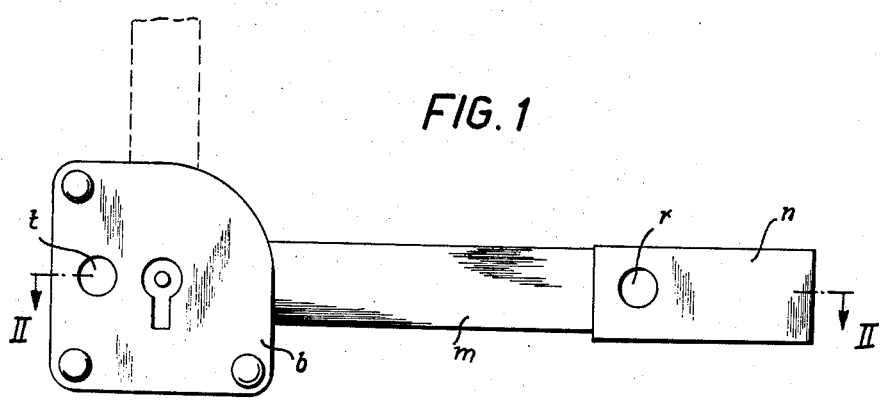
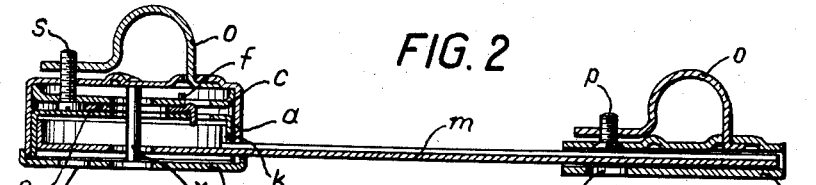
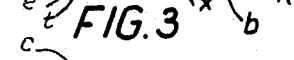  
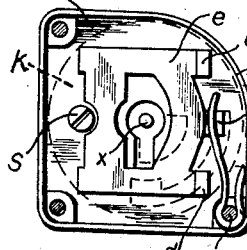 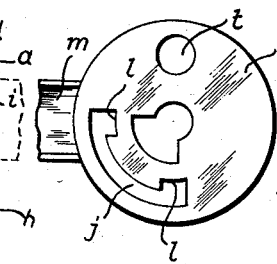 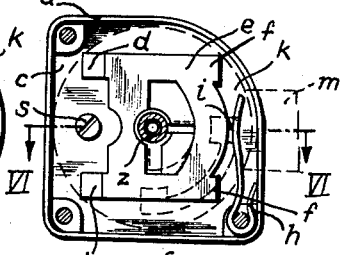
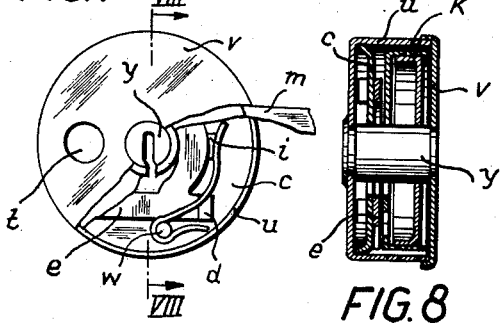
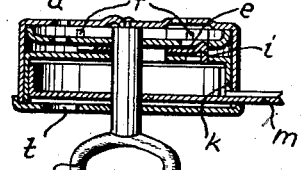
INVENTOR
GUSTAV NAUJOKAT
by *Mestern & Kollin*
ATTORNEYS

United States Patent Office 2,869,352
Patented Jan. 20, 1959

2,869,352

LOCK FOR BICYCLES AND THE LIKE

Gustav Naujokat, Wetter, Westphalia, Germany, assignor to Firma Wilhelm Schroeder, Wetter, Westphalia, Germany Application August 6, 1956, Serial No. 602,204

Claims priority, application Germany May 15, 1956

6 Claims. (Cl. 70—227)

The invention relates to a bicycle lock with a bar capable of swinging between the spokes.

A great many different types of bicycle locks are known. Most comprise a bolt axially displaceable between the spokes against spring action. Manipulation of such locks is troublesome and inconvenient because the bolt is immediately adjacent to the key to be thrust into the lock to open it. This leaves but little area of purchase for opening or closing the lock with the finger, and moreover considerable pressure must be exerted. Other known locks have a swingable bar, the force required to close the lock being diminished by the lever arm provided by the length of the bar. However, it is generally difficult to get the bar between the spokes into locked position. Another common defect of bicycle locks is lack of security. Ordinary locks clamped to one member of the fork can be rotated around the member, thus swinging the bar out of position perpendicular to the wheel into a position parallel thereto, thus freeing the bicycle for use without opening the lock.

The object of the present invention is to provide a bicycle lock with a swinging bar eliminating these disadvantages and moreover considerably simpler and cheaper to manufacture than known bicycle locks.

This problem is solved, according to the invention, by making the bar integral with a rotatable disc accommodated in a casing and movable with a key, which disc is engaged in the extreme positions of its swing by a bolt preventing its movement and displaceable from locked position against spring action by means of a key, the lock being associated with a strike attachable to the other member of the fork to receive the free end of the bar in locked position. In a preferred embodiment of the lock, a plate is provided in the back of the lock to guide the bar, which has bent tabs to engage guide slits in the plate. Another feature consists in that a bent tip on the bar engages a circular slot in the rotatable disc, being caught by stops at the two ends of the slot under the pressure of a leaf spring. Still another feature consists in that the guide plate, when the key is turned, engages a depression in the web of the key and holds it in the "open" position of the lock. Still another feature consists in that the keyhole in the rotatable disc has a sectorial enlargement permitting free motion of the web of the key over a portion of its rotary movement of opening and closing the lock. Still another feature consists in that a hasp hooked into the back of the lock can be held thereto by a screw, the assembly opening provided for this screw through other parts of the lock being obstructed by the rotatable disc when the bar is in locked position. Finally, another feature consists in that the strike to receive the free end of the bar consists of a channel with hasp attached thereto, its assembly screw being countersunk in one flange of the channel and concealed by the depressed bar. The lock according to the present invention makes it possible for the swinging bar to be propelled into and out of locked position with the key, and is thus very simple to operate. Moreover, the strike receiving the free end of the bar makes the lock very secure, as there is no way of moving the lock when closed. Finally, despite its security and ease of operation, the lock is of very simple construction and inexpensive to manufacture.

The device according to the invention will now be more fully described with reference to the accompanying drawing, but it should be understood that these are given by way of illustration and not of limitation and that many changes in the details may be made without departing from the spirit of the invention.

In the drawing,

Fig. 1 shows an embodiment of a bicycle lock with strike for the free end of the bar, in front view;

Fig. 2 shows a section along the line II—II in Fig. 1;

Fig. 3 shows the lock in front view, with cover removed;

Fig. 4 shows a rotatable disc, in back view;

Fig. 5 shows the lock in another position, in front view, with cover removed as in Fig. 3;

Fig. 6 shows a section along the line IV—IV in Fig. 5;

Fig. 7 shows a modified embodiment, in front view with cover partially broken away;

Fig. 8 shows a section along the line VIII—VIII in Fig. 7.

Referring now to Figs. 1 to 6, the lock has a substantially square casing $a$ with one rounded corner and a cover $b$ riveted in place. Resting against the back wall of the casing there is a plate $c$ with slits $d$ guiding a tumbler $e$ with bent tabs $f$. The tumbler $e$ is acted upon by a leaf spring $h$ rounding a rivet pin $g$. Over tumbler $e$, there is a rotatable disc $k$ bearing the bar $m$. A tip $i$ on tumbler $e$ engages an arcwise slot $j$ in disc $k$, engaging stops $l$ at the ends of slot $j$ under the action of spring $h$. In locked position, bar $m$ drops into a strike channel $n$ linked to a hasp $o$ attachable with a screw $p$ to one member of the fork of a bicycle. The assembly opening $r$ in channel $n$ is obstructed by the bar $m$ when in locked position. Another hasp $o$ is linked to the back wall of the casing $a$, and is attachable with a screw $s$ to the other member of the fork of a bicycle. All parts in front of the head of screw $s$ are provided with assembly openings $t$, but these coincide only when the lock is open, thus making it possible to attach or detach the lock, whereas when the bar is in locked position the rotatable disc $k$ obstructs the said openings.

In the embodiment of Figs. 7 and 8, the lock has a circular casing $u$ with cover $v$ welded in place. The spring $h$ is mounted on a pin $w$ fixed to the back wall of the lock. Also, the pin $x$ in the keyhole of the embodiment according to Figs. 1 to 6 is replaced in this embodiment by a revolving plug $y$ to receive a flat key.

To open the lock, or in other words to bring the bar $m$ into the position indicated by dotted lines in Fig. 1, a key $z$ which is provided with a slotted bitting $z^1$, $z^2$ extending on both sides of plate $c$ and provides guidance for the key (Figs. 5, 6), is inserted in the lock and turned. By a rotation of about 90°, the key $z$ moves the tumbler $e$ out of the position of Fig. 3 into the position of Fig. 5 thrusting the tip $i$ out of the stop $l$ in the disc $k$, indicated by dotted lines. The disc $k$ does not participate in this rotation, the key being free to move in the sectorial enlargement of the keyhole in the disc, and engages disc $k$. But if the key $z$ is turned beyond 90°, it takes the disc $k$ with it and swings the bar $m$ out of locked position into the position shown by dotted lines in Fig. 1. The tip $i$ of the tumbler travels in the slot $j$ of disc $k$, and engages the other stop $l$ under the pressure of spring $h$ when released by the key $z$. The key $z$ cannot be withdrawn in this position of the lock, but is held and secured against loss by the engagement of plate $c$ with the key. When the tumbler $e$ is turned back into locked position, the parts of the lock execute the same maneuvers in reverse upon turning of the key and the disc in the opposite direction. The mode of operation and maneuvers of the locking mechanism are the same in the lock of Figs. 1 to 6 and the lock of Figs. 7 and 8, and it is of course possible to provide the lock of Figs. 7 and 8 with a pin $x$, or the lock of Figs. 1 to 6 with a revolving plug $y$.

What I claim is:

1. Bicycle lock with bar capable of swinging between the spokes, comprising a rotatable disc integral with the said bar and movable by means of a key provided with bitting having a slot perpendicular to the key shank, a casing accommodating said disc, a tumbler movable by means of the key against spring action and capable of obstructing rotation of said disc when the bar is at either end of its swing, and a strike channel attachable to one member of the fork of a bicycle to receive the free end of the bar in locked position.

2. Bicycle lock according to claim 1, comprising a leaf spring acting upon said tumbler, the latter being provided with a bent tip capable of engaging an arcwise slot in said disc and catching in either of two recesses at the ends of the slot under the action of said spring.

3. Bicycle lock according to claim 1, comprising a plate surmounting a wall of said casing to guide the said tumbler, said tumbler having bent tabs to engage slits in said plate.

4. Bicycle lock according to claim 3, wherein the said plate, when the key is turned, engages with the slot in the key bitting to retain it when the lock is in "open" position.

5. Bicycle lock according to claim 1, in which said disc is provided with a keyhole which is sectorially enlarged to permit free motion of the web of the key over a portion of said key's rotation in opening and closing the lock.

6. Bicycle lock according to claim 1, comprising a hasp linked to the wall of said casing and attachable thereto by means of a screw, the remaining parts of the lock being provided with assembly openings for the screw, which openings are obstructed by the said disc when the bar is in locked position.

References Cited in the file of this patent

UNITED STATES PATENTS

| 103,256 | Towne | May 17, 1870 |

FOREIGN PATENTS

| 448,984 | Great Britain | June 18, 1936 |
| 489,004 | Great Britain | July 18, 1938 |
| 800,529 | Germany | Nov. 13, 1950 |